Figure 1:
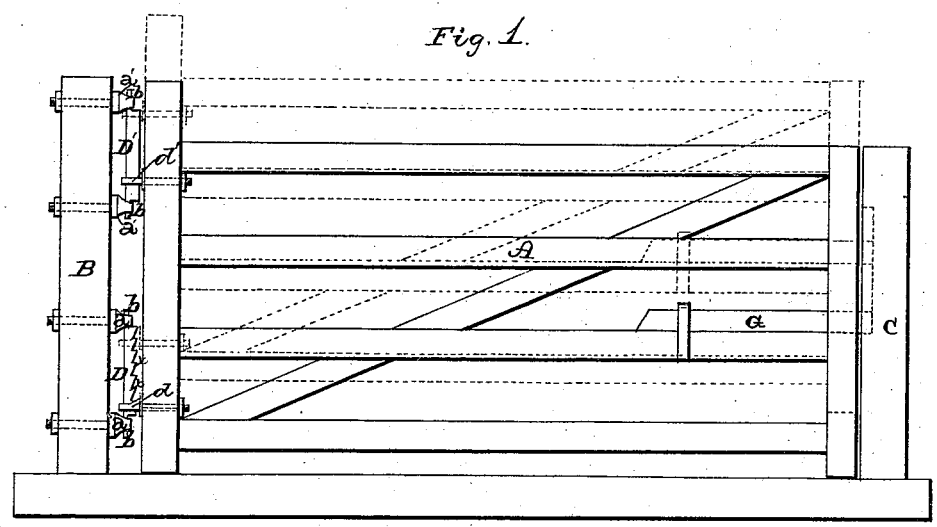
Figure 2:
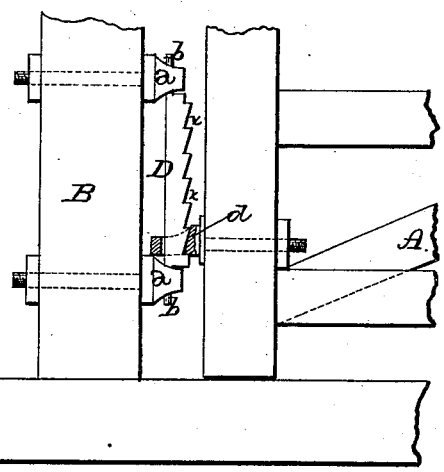

L. G. WOOLLEY.
SWINGING GATE.

No. 188,218. Patented March 6, 1877.

WITNESSES:
J. W. Garner
R. M. Barr

INVENTOR:
L. G. Woolley
per
F. A. Lehmann,
Atty.

UNITED STATES PATENT OFFICE.

LEONIDAS G. WOOLLEY, OF MENDON, MICHIGAN.

IMPROVEMENT IN SWINGING GATES.

Specification forming part of Letters Patent No. 188,218, dated March 6, 1877; application filed January 15, 1877.

*To all whom it may concern:*

Be it known that I, LEONIDAS G. WOOLLEY, of Mendon, in the county of St. Joseph and State of Michigan, have invented certain new and useful Improvements in Gates; and I do hereby declare the following to be a full, clear, and exact description of the invention, such as will enable others skilled in the art to which it pertains to make and use it, reference being had to the accompanying drawings, which form part of this specification.

My invention relates particularly to gates; and it consists in the construction of an adjustable hinge for gates which will permit the gate being raised or elevated for convenience in allowing small animals to pass under from one field to another, and also for the purpose of swinging the gate over snow-drifts and other obstructions, as will be hereinafter more fully set forth.

The annexed drawing, which forms a part of this specification, fully illustrates my invention.

A represents a gate of any suitable construction. B is the gate-post to which the gate is hung, and C is the post against which it closes. In the post B are fastened two eye-bolts, $a\ a$, in which is pivoted a vertical bar, D, having journals $b\ b$ at its ends to enter said eyebolts. The bar D is, on its outer edge, formed with a series of ratchet-teeth, $x\ x$, as shown. This bar passes through an elongated slot in the head of a bolt, $d$, which is secured in the inner end of the gate, and completes the adjustable hinge.

This hinge may be either at the upper or lower end of the gate, as may be desired, and at the other end of the gate any suitable adjustable or sliding hinge may be employed, though I prefer to use the kind of hinge shown, which is composed of a plain vertical bar, $D'$, journaled in two eyebolts, $a'\ a'$, fastened in the gate-post B, and a slotted bolt, $d'$, fastened in the gate sliding thereon.

The gate A may be raised to any height desired, and will remain there by the weight of the gate causing its outer end to sag down until the eyebolt $d$ is caught on one of the ratchet-teeth $x$. The gate will now swing in the usual manner. To lower the gate, the outer end thereof is simply raised a very little, which allows the gate to gently slide down.

At the outer end of the gate is a sliding bolt, G, to fasten the gate to the post C. When the gate is thus fastened, it is held firmly in place, so as to prevent hogs, &c., from rooting under and raising the gate. When raised to its full height, it allows sheep and other small animals to pass under. The sliding bolt G also prevents the gate from being loosed and lowered.

My adjustable hinge may be easily applied to any common gate, and the gate then adjusted or set at any height desired.

Having thus fully described my invention, what I claim as new, and desire to secure by Letters Patent, is—

The combination of the ratchet-bar D, bolt $d$ catching thereon, eyebolts $a\ a'$, smooth bolt $D'$, and bolt $d'$, the parts being arranged for action substantially as shown.

In testimony that I claim the foregoing I have hereunto set my hand this 10th day of January, 1877.

LEONIDAS G. WOOLLEY.

Witnesses:
WM. MCPHERSON,
I. J. MCCLELLAN.